United States Patent Office 3,388,646
Patented June 18, 1968

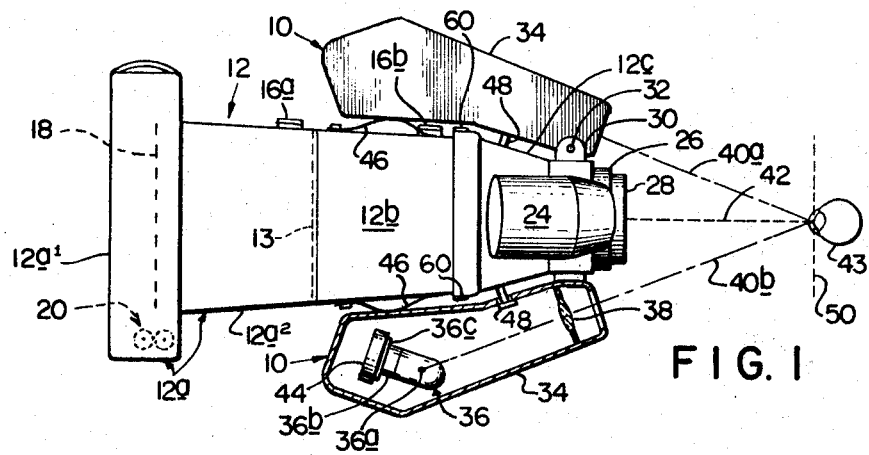
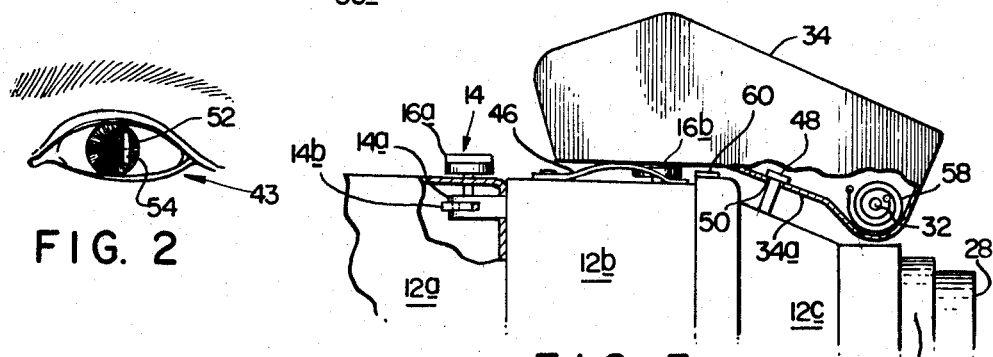
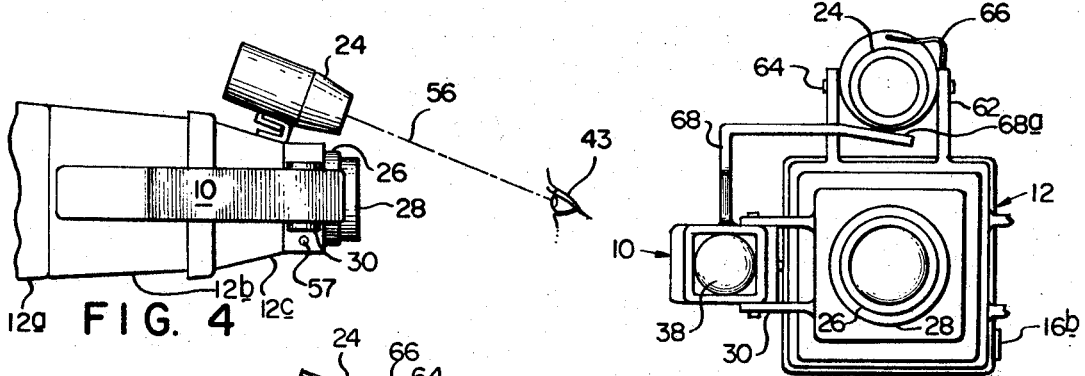
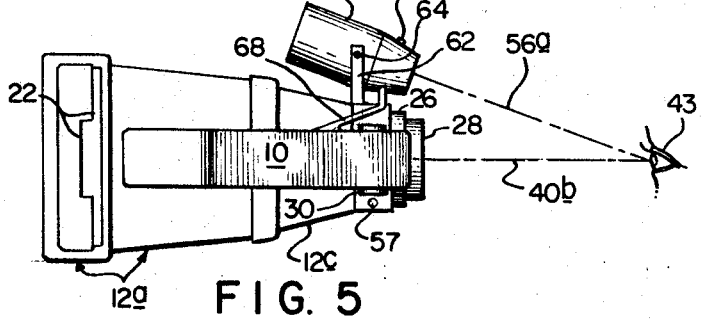
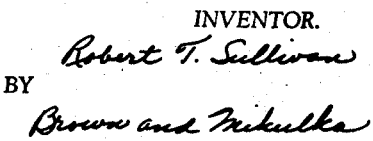

3,388,646
PHOTOGRAPHIC DEVICE
Robert T. Sullivan, Norwood, Mass., assignor to Polaroid Corporation, Cambridge, Mass., a corporation of Delaware
Filed Feb. 2, 1966, Ser. No. 524,592
10 Claims. (Cl. 95—11)

This invention relates to ophthalmic photography and especially to a focusing device for incorporation with a short-range camera having rapidly interchangeable housing components, the device establishing a correct camera-to-subject distance for any given assemblage of housing components and providing therewith a choice of magnifications of the subject.

The focusing device of the present invention is intended for use in conjunction with a so-called "close-up" or short-range camera for a knockdown type in many respects closely similar to the "CU-5" camera, sold by the Polaroid Corporation, Cambridge, Mass., U.S.A. and described in detail in the copending U.S. patent application Ser. No. 422,149, now Patent No. 3,330,193, filed Dec. 30, 1964. This camera embodies the well-known self-processing features associated with cameras manufactured by the Polaroid Corporation, whereby a finished print is produced within a matter of a few seconds following the photographic exposure. The camera also possesses certain features relating to interchangeable lenses and housing sections or ratio multipliers which permit a variety of image sizes and magnifications. It is adapted to use either black-and-white or color film as, for example, a "Type 107" black-and-white film assembly or a "Type 108" color film assembly, both sold by Polaroid Corporation. For an ophthalmic adaptation, a color film is that preferably employed. Each print-carrying area of the film assembly is of a rectangular shape measuring approximately 3¼ x 4¼ inches. The film assemblies are supplied in the form of a film pack and each incorporates a releasably-contained processing liquid which is released, after the photographic exposure, by processing mechanism of the camera and spread throughout the exposed silver halide emulsion, the print being formed by a diffusion transfer process involving imbibition of the liquid into at least one of the layer components of the film assembly.

While the camera with which the focusing device of the present invention is incorporated closely resembles the aforesaid "CU-5" camera, it differs therefrom principally with respect to the front or lens unit. Thus, whereas the front unit or section of the referenced camera includes a built-in electronic flash ring-light surrounding the lens aperture, automatic shutter and diaphragm control means, and a trigger-type shutter release, the camera of the present invention employs, respectively, an electronic flash unit particularly adapted to an ophthalmic illumination function which is mounted at one side of the lens aperture, manual shutter and aperture control means, and a cable shutter release. Other structural differences essential to operation of the focusing device of the present invention will be noted from the description which follows.

Objects of the present invention are to provide, for ophthalmic photographic purposes, a focusing device adapted to incorporation with a short-range or close-up camera of a given type for establishing correct camera-to-subject distances relative to the obtaining of various image magnifications; to provide a focusing device of the nature stated which is adapted to angularly project two beams of light to a given degree of alignment at an image plane which determines the correct location of the photographic subject; to provide a focusing device of the character described which is identified with a camera capable of producing a finished print immediately following each of a succession of photographic exposures; to provide a focusing device, as stated, which automatically establishes the aforesaid correct camera-to-subject distances in conjunction with changes of focal distances of the camera as provided by removal or insertion of camera housing sections or ratio multipliers; to provide a focusing device of the aforesaid category which is adapted to the provision of either a 4× or 6× magnification; to provide a focusing device as specified which is interlocked or otherwise connected with an electronic flash unit to produce concurrent focusing movement of the latter; and to provide, as an integral unit, a focusing device of the character described mounted on a camera housing element containing a lens, shutter and diaphragm assembly, the unit being adapted to incorporation with a mating component of a short-range camera.

Other objects of the invention will in part be obvious and will in part appear hereinafter.

The invention accordingly comprises the apparatus possessing the construction, combination of elements and arrangement of parts which are exemplified in the following detailed disclosure, and the scope of the application of which will be indicated in the claims.

For a fuller understanding of the nature and objects of the invention, reference should be had to the following detailed description taken in connection with the accompanying drawing wherein:

FIGURE 1 is a diagrammatic plan view, partly in section, of an assemblage of the focusing device of the invention with associated camera and electronic flash means;

FIG. 2 illustrates one eye of the photographic subject showing the projection thereon of aligned images of the filaments of light source components of the focusing device;

FIG. 3 is a diagrammatic, fragmentary, plan view, partly in section and with parts broken away, of a portion of the assemblage of FIGURE 1;

FIG. 4 is a diagrammatic side view of the focusing device mounted on a camera with an electronic flash unit mounted on the latter;

FIG. 5 is a diagrammatic side view of an assemblage of the focusing device and camera including means interlocking the focusing device with an electronic flash unit; and FIG. 6 is a diagrammatic front view of an assemblage of the focusing device, the camera and the flash unit of FIG. 5.

Referring now to FIGS. 1 and 3, the focusing device 10 of the invention is shown incorporated with a camera 12. The camera is of a knockdown type composed of separable sections, namely, a rear section 12a, an intermediate section or ratio-multiplier 12b and a front section 12c. The facing surfaces of any two of the sections are releasably held together by suitably mating flange portions 13 and by latching means 14 comprising a pair of engageable fixed clevis-and-cross-bar members 14a projecting rearwardly from sections 12b and 12c, engaged by movable arm-with-recess members 14b of sections 12a and 12b, which are actuated by the rotatable knobs 16a and 16b, one only of each latching means being shown. At latched position the cross-bar of the clevis is engaged by the recess of the arm.

A rectangular chamber-like 12a1 of the rear section 12a is adapted to hold a film pack and to provide a focal plane 18 for correctly locating the foremost film assembly of the film pack to perform its photographic exposure. It also includes compression means such as a pair of pressure rolls 20 between which the film assembly is passed to effect release and spreading of the processing liquid contained in each film assembly, accompanied by processing of the exposed photosensitive emulsion and formation of the photographic print. A slot 22 is provided at one end of the chamber 12a1 for drawing, by means of a tab or leader, each film assembly between the pressure rolls 20 after its exposure, and thence completely from the camera.

The terms "top" and "bottom" or "upwardly" and "downwardly," as employed herein, are to be construed with reference to the location of the elements as illustrated in the figures. Thus in the plan views of FIGS. 1 and 3 the upper or top portions are to be considered as those located toward or nearest to the viewer. In the side views of FIGS. 4 and 5 and the front view of FIG. 6, they are to be regarded as located toward the upper extremities of the figure being described, the lower or bottom portions being identified with the lower extremities thereof. The terms "front' and "rear" or "forwardly" and and "rearwardly" are to be understood in the sense of their relative proximity to or remoteness from a location forwadly of the camera such as that of the photographic subject.

The portion 12a2 of camera housing section 12a is, essentially, a hollow chamber extending forwardly from the focal plane and enclosing, in addition to the latching means 14, a pivotal film-projecting shield, not shown, interlocking with knob 16a, which automatically covers the open forward end of section 12a2 when the sections 12a and 12b are disassembled. The shield is pivoted to one side of the open front end of section 12a when the knob 16a is so rotated as to provide a latched condition of the sections 12a and 12b. Housing section 12b, exclusive of latching and protective shield means similar to those of section 12a, is merely a hollow chamber and is employed as a ratio multiplier for lengthening the distance between the subject and the film plane. Housing section 12c contains a lens, shutter and diaphragm assembly of generally conventional structure. For the type of ophthalmic photography contemplated, the lens may suitably be a Rodenstock "Eurygon" f/4 35 mm. macro lens, although not limited thereto. The external surface of the housing 12c serves to mount both the focusing device 10 and an electronic flash unit 24. Assuming, for example, iris-type shutter and diaphragm mechanisms, the aperture and shutter-speed adjustments may be accomplished in the usual manner by rotating the adjusting rings 26 and 28, respectively. Any suitable flash-tube may be employed in the unit 24 as, for example, an "FT–118" flashtube sold by General Electric Co., Photo Lamp Department, Cleveland, Ohio, U.S.A.

The focusing device 10 includes a pair of identical units, pivotally mounted on the camera, at left- and right-hand sides thereof, for movement in a horizontal plane or planes, by the yokes 30 and pivot pins 32. Each unit includes a housing 34, a lamp 36 and a positive lens 38. Each associated lamp and lens is so relatively disposed as to project a beam 40a or 40b forwardly at a given acute angle with respect to the optical axis 42 of the camera. At a point or along a vertical line at which the two converging beams are brought together, the correct location for the positioning the photographic subject, such as a given area, e.g., the cornea, iris, etc., of a human eye 43, is designated. Additionally, the beams serve to locate the approximate center of the field to be photographed. Preferably each lamp is of a type having a short linear horizontal filament 36a, accurately and uniformly centered on the axis of the lamp base 36b. The lamp base includes a prefocusing collar 36c with which the lamp filament is parallel. All tolerances of the lamp and socket structure are extremely close to insure that correct performance is achieved. The base may, appropriately, be of a known type which includes a plurality of positioning pins insertable in orifices such as locking eyelets of the socket, these components being so circumferentially disposed as to constitute keying means for insertion of the lamp in the socket in but one way, thereby providing a predetermined disposition of the lamp filament.

Assuming a three-section assemblage of the camera to be that employed, as shown in FIGS. 1 and 3, that is, one which includes the ratio multiplier section 12b and provides a 6× magnification, each focusing unit 10 is biased for pivotal movement, about pivot 32, away from an adjacent side of the camera by a flat spring 46, attached at one end to the sides of the section 12b and bearing against each housing 34 of the focusing device. The maximum extent of this pivotal movement of each focusing unit 10 is determined by limit stop means in the form of a flat-headed stud 48, fixedly mounted on the camera section 12c with its stem passing freely through an aperture 50 formed in a wall portion 34a of the housing 34. The spring 46 forces the wall portion 34a against the enlarged head of the stud 48, thus providing the angular disposition of the focusing unit 10 and the angular convergence of the beams 40a and 40b which are illustrated in FIG. 1. Accordingly, a correct subject location or plane is established at 50 at a point or line where the beams intersect. Otherwise stated, a given correct distance between subject and film plane is established.

A preferred arrangement of the images of the focusing-lamp filaments at the subject plane is illustrated in FIG. 2. The image of one filament is represented at 52, the other at 54. The two images are of equal length and width, vertically aligned and in abutting relationship. A vertical image is produced when the filaments 36a are disposed vertically, a condition which may be automatically assured when the lamp 36 is inserted in the socket 44 by reason of a given arrangement of the keying means provided. Assuming, for instance, that the vertically aligned pattern of images is that provided and that the filament image 52 is that produced by the beam 42a, it is then to be understood that the unit 10 relating thereto, or the optical system wtihin the unit, is positioned slightly above the unit 10 or optical system producing the beam 40b. Thus, the optical axis of the focusing unit 10 producing the beam 40b may be considered as parallel to and slightly below the optical axis of the camera and the optical axis of the focusing unit producing the beam 40a as parallel to and slightly above the optical axis of the camera. While the image pattern shown is perhaps most efficient and easily read, other arrangements thereof are possible as, for example, a crossed relation of linear filament images. With the subject plane correctly established by the focusing device 10, the electronic flash unit 24 is to be understood as directed along an optical axis 56 toward the eye 43 for performing the photographic exposure, as more clearly indicated in FIG. 4. Means for attaching a cable-type shutter-release is indicated at 57. Energization of the flash lamp is performed in the usual manner through closing of shutter contacts for the purpose, for example at an "x" synchronization setting.

Let it now be assumed that the ratio multiplier section 12b has been removed to provide a two-section assemblage and a 4× magnification, as illustrated in FIG. 5. With the removal of the intermediate section 12b, the biasing springs 46 are, of course, no longer operative because they are not present. Under the influence or bias exerted by the torsion springs 58, one spring only being shown, both of the focusing units 10 are caused to rotate convergently toward the respective sides of the camera until contact of surface portions of the housing 34 with the limit stop 60 occurs. A new and more distant subject plane is thus established by reason of the smaller angles which the focusing beams 40a and 40b now make with the optical axis 42 of the camera. A readjustment of the optical axis of the flashlamp 24, commensurate with the new position of the photographic subject, is indicated at 56a. In résumé, it will thus be seen that the prevailing direction of pivotal movement of the housing units 10 is dependent upon the then-existing assemblage of camera sections and that the limit stops which are operative to determine the angle of convergence of the two focusing beams, are in turn, dependent on the existing direction of pivotal movement of the units.

By way of example, relative to the three-section camera assemblage of FIGS. 1, 3 and 4 which provides a 6× magnification, the following optical data is applicable: a distance between the first nodal point of the camera lens and the photographic subject of 1.605 inches; a distance between the photographic subject and film plane 18 of 11.559 inches; an angle between the optical axes of the focusing units 10 and the optical axis of the camera of 36°. With respect to the two-section camera assemblage of FIG. 5 producing a 4× magnification, comparable data are as follows: a distance between the first nodal point of the camera lens and photographic subject of 1.680 inches; a distance between the photographic subject and film plane 18 of 8.715 inches; an angle between the optical axes of the focusing units 10 and the optical axis of the camera of 35.5°.

Means for interlocking the focusing device 10 with the electronic flash unit 24 to automatically direct the latter in accordance with changes of subject distance are illustrated in FIGS. 5 and 6. As hereinbefore described, the changes of distance between subject and film plane are determined by the units of the focusing device 10 as an accompaniment of the addition or subtraction of sections of the camera, intermediate its front and back sections. In FIG. 5, an intermediate section has been removed and the distance from lens to subject has been increased. The flash unit 24 is so located that its optical axis is in a vertical plane which includes the optical axis of the camera. The interlocking means for tilting the flash unit to direct its light to the slightly more remote location of the subject include the upwardly-extending yoke 62 mounted on the upper surface of camera section 12c; pivotal mounting means 64 at the extremeties of the yoke mounting the flash unit and about which the flash unit is freely tiltable; a flat spring 66 bearing against the front of the flash unit to bias it downwardly, and a multi-angled arm 68 mounted on the upper surface of one of the focusing units 10, to the rear of its pivot point and projecting upwardly and inwardly toward the flash unit so that the under surface of the flash unit, forwardly of its pivot point, bears thereagainst. The extremity 68a of the arm against which the under surface of the flash unit bears is so angled as to constitute a cam, the under surface of the flash unit serving as a cam follower. When the focusing unit 10 is pivoted laterally about the axis 32 the arm 68 is moved translationally and the camming surface 68a causes the flash unit to tilt upwardly or downwardly in accordance with the lateral movement of the arm toward or away from the flash unit. Thus, when each focusing unit 10 is pivoted inwardly toward the sides of the camera to establish a more distant location of the subject, the arm 68 moves inwardly and the cam surface 68a causes the flash unit to tilt upwardly by a given amount so as to realign its beam at the new subject location. As will be apparent, an opposite lateral movement of the arm 68 tilts the flash unit downwardly.

Although but one ratio multiplier section 12b has been shown, an additional section could be included to provide a still further magnification. In such an event, the flat spring elements 46 and limit stop means of the additional section would be modified to provide a more convergent direction of the beams than that shown. The section 12b, serving merely a spacing function, would then be mounted between the new section and the section 12a.

Since certain changes may be made in the above apparatus without departing from the scope of the invention herein involved, it is intended that all matter contained in the above description or shown in the accompanying drawing shall be interpreted as illustrative and not in a limiting sense.

What is claimed is:

1. A focusing device for use in opthalmic photography when incorporated with a short-range knockdown camera including a plurality of selectively interchangeable sections, said device establishing a choice of correct distances between said camera and a photographic subject in conformance with any of various assemblages of said camera sections which are identified with various magnifications of said subject and comprising a pair of housing units pivotally mounted on a separable front section of said camera at left- and right-hand sides thereof for pivotal movement in a horizontal plane, light-projecting means including a light source and a positive lens mounted within each of said housing units for projecting convergent beams of light forwardly of said camera at substantially identical acute angles relative to a vertical plane which includes the optical axis of the camera, a plurality of spring means biasing said housing units for pivotal movement in opposite directions, the prevailing direction of said movement being determined by the then-existing assemblage of camera sections, and a plurality of limit stop means mounted on said camera front section for limiting said pivotal movement in opposite directions according to said direction of movement and assemblage of camera sections, thereby to produce joining of said convergent beams at various given locations forwardly of said camera which define said correct distances between said camera and said photographic subject.

2. A device, as defined in claim 1, wherein said plurality of selectively interchangeable camera sections includes, in addition to said front section, a rear section for carrying a photosensitive film material and providing a focal plane, and an intermediate section constituting a ratio multiplier for altering the distance between a photographic subject and said focal plane, said front section mounting lens, shutter and diaphragm means of said camera.

3. A device, as defined in claim 1, wherein said plurality of interchangeable camera sections is releasably held together by mating flange and latching means.

4. A device, as defined in claim 1, wherein the optical axes of said light-projecting means of said pair of focusing-device housing units are parallel to but positioned, respectively, slightly above and slightly below the optical axis of said camera.

5. A device, as defined in claim 2, wherein a first of said spring biasing means is mounted on said intermediate section and a second of said spring biasing means is interconnected between said front section and said pivotally mounted housing units.

6. A device, as defined in claim 2, wherein said rear section includes means for processing said film material.

7. A device, as defined in claim 1, wherein said camera front section includes an electronic flash unit mounted on an external surface thereof and directed toward said photographic subject.

8. A device, as defined in claim 1, wherein said convergent beams serve to determine an approximate center of the photographic field.

9. A focusing device for use in ophthalmic photography when incorporated with a short-range knockdown camera including a plurality of selectively interchangeable sections, said device establishing a choice of correct distances between said camera and a photographic subject in conformance with any of various assemblages of said camera sections which are identified with various magnifications of said subject and comprising a pair of housing units pivotally mounted on a separable front section of said camera at left- and right-hand sides thereof for pivotal movement in a horizontal plane, light-projecting means including a light source and a positive lens mounted within each of said housing units for projecting convergent beams of light forwardly of said camera at substantially identical acute angles relative to a vertical plane which includes the optical axis of the camera, a plurality of spring means biasing said housing units for pivotal movement in opposite directions, the prevailing direction of said movement being determined by the then-existing assembly of camera sections, a plurality of limit stop means mounted on said camera front section for limiting said pivotal movement in opposite directions according to said direction of movement and assemblage of camera sections, thereby to produce joining of said convergent beams at various given locations forwardly of said camera which define said correct distances between said camera and said photographic subject, an electronic flash unit pivotally mounted on the upper surface of said camera front section, means biasing said flash unit for pivotal movement in a given direction, and cam means mounted on one of said housing units of said focusing device adapted to bear against said flash unit and actuate its pivotal movement in given directions when said housing units are pivoted in said horizontal plane.

10. A device, as defined in claim 9, wherein the optical axis of said flash unit and said camera lie within a vertical plane.

References Cited

UNITED STATES PATENTS

| | | | |
|---|---|---|---|
| 2,239,379 | 4/1941 | Bucky | 95—44 |
| 2,581,300 | 1/1952 | Rossman et al. | 95—11 XR |
| 3,330,193 | 7/1967 | Kaess | 95—11 |

NORTON ANSHER, *Primary Examiner.*

F. L. BRAUN, *Assistant Examiner.*